United States Patent [19]
Buckner et al.

[11] Patent Number: 5,933,319
[45] Date of Patent: Aug. 3, 1999

[54] ELECTRICAL PANELBOARD HAVING AN ENCLOSURE OVER AN EXPOSED TERMINAL OF CIRCUIT BREAKER MOUNTED TO A PANEL OF THE ELECTRICAL PANELBOARD

[75] Inventors: Bill W. Buckner, Albuquerque, N.Mex.; Dale A. Hoppensteadt, Glen Ellen, Ill.

[73] Assignee: Intel Corporation, Santa Clara, Calif.

[21] Appl. No.: 09/087,556

[22] Filed: May 29, 1998

[51] Int. Cl.$^6$ ........................................... H02B 1/01
[52] U.S. Cl. ........................ 361/627; 361/628; 361/652; 361/655; 361/631; 361/641; 361/643; 200/50.22; 200/50.23
[58] Field of Search ..................... 361/627, 652, 361/647, 655, 656, 628, 631, 634, 644, 824; 200/50.22, 50.23, 304; 439/718; 335/202

[56] References Cited

U.S. PATENT DOCUMENTS

| | | | |
|---|---|---|---|
| 2,727,966 | 12/1955 | Reichert et al. | 200/304 |
| 4,774,390 | 9/1988 | Lehman et al. | 200/304 |
| 5,150,091 | 9/1992 | Hart et al. | 335/202 |
| 5,304,761 | 4/1994 | Rosen et al. | 335/202 |
| 5,343,355 | 8/1994 | Ishikawa | 361/617 |
| 5,486,666 | 1/1996 | Wong et al. | 200/304 |
| 5,493,092 | 2/1996 | Rowe | 200/304 |

Primary Examiner—Leo P. Picard
Assistant Examiner—Boris L. Chervinsky
Attorney, Agent, or Firm—Blakely, Sokoloff, Taylor & Zafman

[57] ABSTRACT

An enclosure for an external terminal of a circuit breaker on an electrical panelboard, which includes a body and a cover. The body defines an aperture for inserting an electrical load conductor and is securable adjacent a circuit breaker. The cover is mounted to the body for movement between a first position and a second position. In the first position the terminal is exposed. In the second position the body, the circuit breaker and the cover jointly enclose the terminal.

10 Claims, 4 Drawing Sheets

5,933,319

ELECTRICAL PANELBOARD HAVING AN ENCLOSURE OVER AN EXPOSED TERMINAL OF CIRCUIT BREAKER MOUNTED TO A PANEL OF THE ELECTRICAL PANELBOARD

BACKGROUND OF THE INVENTION

1). Field of the Invention

This invention relates to an electrical panelboard which has an enclosure for an exposed terminal of a circuit breaker mounted to a panel of the electrical panelboard.

2). Discussion of Related Art

FIG. 1 of the accompanying drawings illustrates a conventional electrical panelboard 1 which includes a panel 2, source power leads 3 extending into the panel 2, electrical load conductors 4 extending out the panel 2, and a number of circuit breakers 5 which connect the electrical load conductors 4 to the source power leads 3.

Energized terminals 6A, 6B and 6C are exposed at various locations on the electrical panelboard 10. A dead front (not shown) is usually positioned over the panel 2 so that all the live terminals 6A, 6B, 6C are covered. The dead front has openings through which switches 7 of the circuit breakers 5 can be accessed for operation.

Should an electrical connection or disconnection be made with one of the electrical load conductors 4 to one of the circuit breakers 5, the dead front would have to be removed, thereby exposing all the energized terminals 6A, 6B, 6C.

Exposing the energized terminals 6A, 6B, 6C is hazardous. Certain government codes are designed to prevent exposure of the energized terminals 6A, 6B, 6C while power is still supplied to these terminals. The entire electrical panelboard 1 should therefore be de-energized in order to remove the dead front and expose the terminals 6A, 6B, 6C. De-energizing of the entire electrical panelboard 1 can result in an entire factory or portion of a factory coming to a standstill.

An electrical panelboard is therefore required which provides for removal of the dead front without de-energizing the entire electrical switchboard or exposure of any energized terminals. The panelboard should make provision for making electrical connection without ever exposing an energized terminal.

SUMMARY OF THE INVENTION

An enclosure for an external terminal of a circuit breaker on an electrical panelboard, which includes a body and a cover. The body defines an aperture for inserting an electrical load conductor and is securable adjacent to a circuit breaker. The cover is mounted to the body for movement between a first position and a second position. In the first position the terminal is exposed. In the second position the body, the circuit breaker and the cover jointly enclose the terminal.

BRIEF DESCRIPTION OF THE DRAWINGS

The invention is further described by way of example with reference to the accompanying drawings wherein.

DESCRIPTION OF PREFERRED EMBODIMENT

An electrical panelboard and an enclosure for an exposed terminal for an external terminal of a circuit breaker which is mounted to a panel of an electrical panelboard are disclosed.

In the following description, numerous specific details are set forth in order to provide a thorough understanding of the present invention. It will be evident, however, to one skilled in the art that the present invention may be practiced without these specific details. In other instances other constructions have not been described so as not to obscure the present invention.

In the present invention a conventional electrical panelboard is modified for purposes of work safety. Various shields and enclosures are mounted over live terminals of the panelboard. One enclosure is located over a live terminal of each circuit breaker on the panelboard. The enclosure includes a body and a cover which is slidably mounted to the body. In order to safely work on a specific circuit breaker a switch of the circuit breaker would be switched off. The cover of the enclosure of the relevant circuit breaker would be slid open to reveal a terminal of the circuit breaker. Work would then be done on the relevant circuit breaker. The cover would then be moved to cover the terminal. The switch of the relevant circuit breaker would then be switched on.

Figure 1:
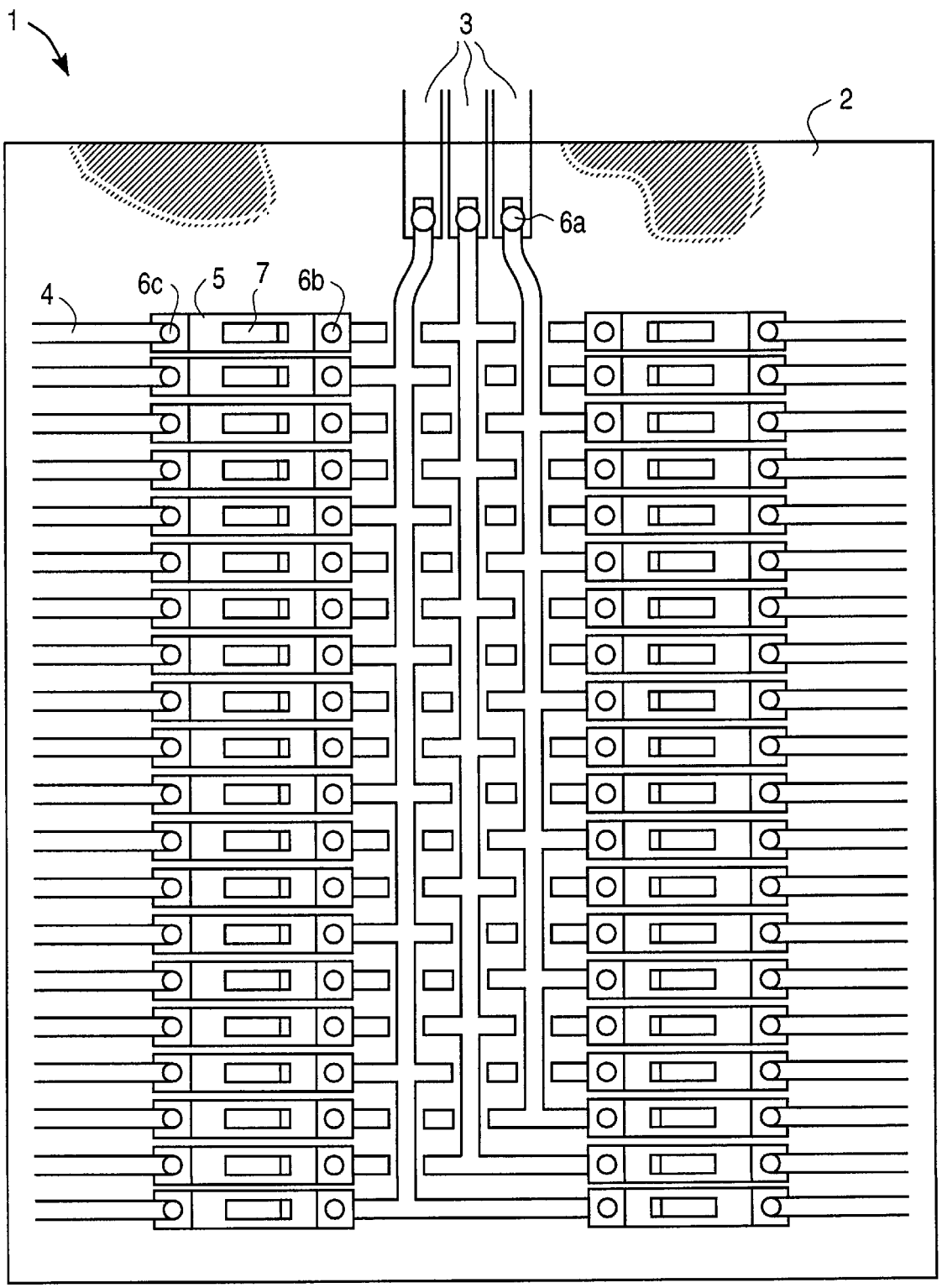
FIG. 1 is a view showing a conventional electrical panelboard.
Figure 2:
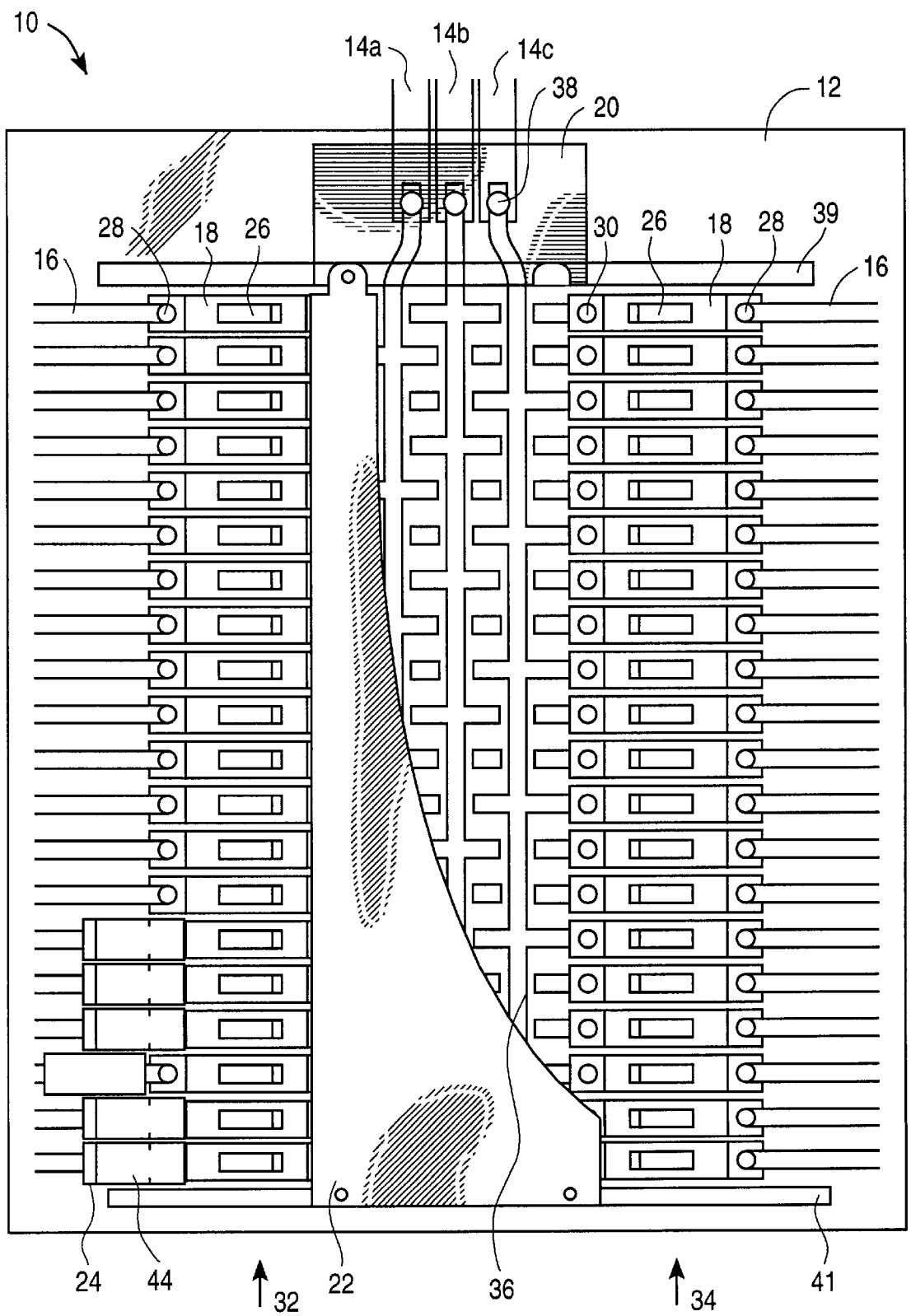
FIG. 2 is a view of an electrical panelboard according to the invention.

FIG. 2 of the accompanying drawings illustrates an electrical panelboard 10, according to the invention, which includes a panel 12, three-phase power leads 14A, 14B, 14C extending onto the panel 12, electrical load conductor 16 extending off the panel 12, a number of circuit breakers 18 which are mounted to the panel 12, a transparent shield 20, a longitudinal shield 22, and a number of enclosures 24, also according to the invention.

The circuit breakers 18 are of conventional kind and are not described in detail herein. Suffice to say that each circuit breaker 18 includes a switch 26 and first and second exposed terminals 28 and 30, respectively. The circuit breakers 18 are located in first and second rows, 32 and 34 respectively, on opposing sides of the panel 12.

Electrical extensions 36 are connected to the three phase power leads 14A, 14B, 14C by means of metal main terminal lugs 38. The electrical extensions 36 are connected in a network to the respective second terminals 28 of the circuit breakers 18. The first and second rows 32 and 34 are shown further apart than they actually are in order to illustrate the network of electrical extensions 36. The electrical load conductors 16 are connected to the respective first terminals 28 of the circuit breakers 18.

A first insulative block 39 is secured to the panel 12 on one side of the circuit breakers 18 and a second insulative block 41 is secured to the panel 12 or an opposing side of the circuit breakers 18.

The transparent shield 20 is secured over the main terminal lugs 38.

The longitudinal shield 22 is secured to the first insulative block 39 and the second insulative block 41 over the second terminals 30 of the circuit breakers 18. The longitudinal shield 22 is shown wider than it actually is in order to illustrate the network of electrical extensions 38.

Figure 3A:
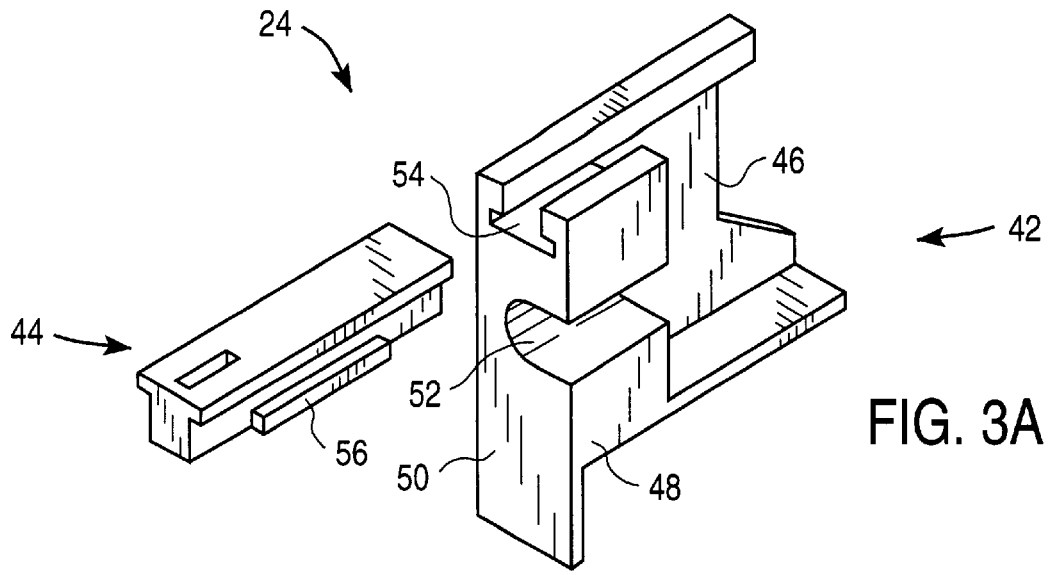
FIG. 3A is an exploded perspective view of an enclosure according to the invention.

FIG. 3A is an exploded perspective view of one of the enclosures 24 of FIG. 2. The enclosure 24 includes a body 42 and a cover 44. Both the body 42 and the cover are preferably made of insulative plastics material such as G.E. Noryl SE3 which is manufactured by General Electric.

The body 42 includes a first side wall 46 and a second side wall 48 opposing the first side wall 46, and an end wall 50 between the first side wall 46 and the second side wall 48.

The second side wall is partially open. An aperture 52 extends through the end wall 50 into the body 42 and defines a channel shape which is open towards the second side wall 48.

An upper portion of the body 42 is formed with a slot 54. The cover 44 is longitudinal in shape and is formed with formations 56 on both sides thereof which are complementary receivable by the slot 54. The cover 44 can thereby be mounted to the body 42 for movement with the formations 56 sliding within the slot 54.

Figure 3B:
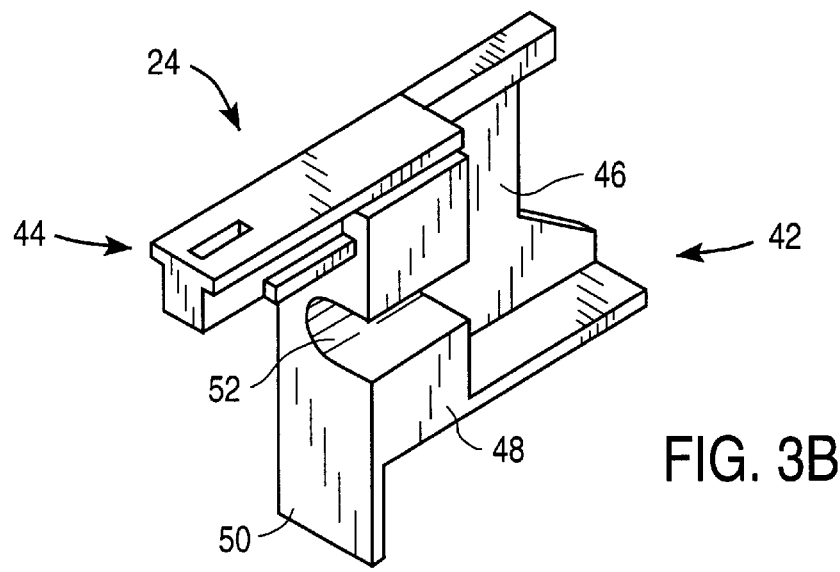
FIG. 3B is a perspective view of the enclosure of FIG. 3A wherein a cover of the enclosure is in an open position.

FIG. 3B illustrates the enclosure 24 of FIG. 3A wherein the cover 44 is moved into a first position onto the body 42 so that the cover 44 is only partially located on the body 42.

Figure 3C:
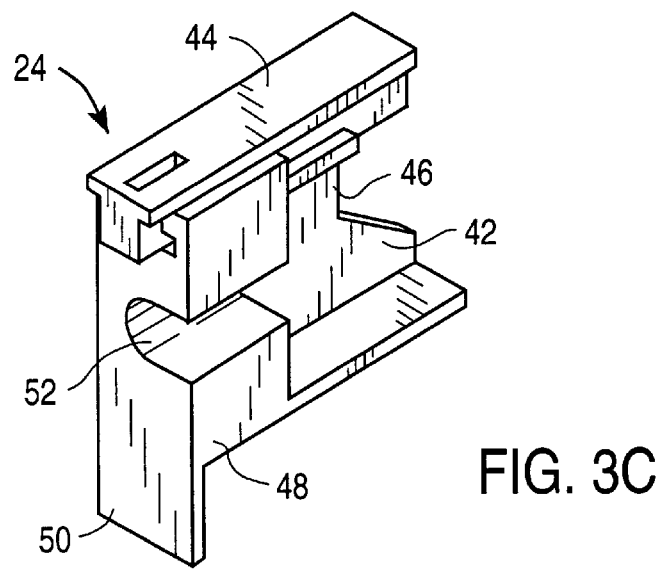
FIG. 3C is a perspective view of the enclosure of FIG. 3A wherein the cover is in a closed position.

FIG. 3C illustrates the cover which is moved into a second position wherein the cover 44 is located entirely on the body 42.

Figure 4:
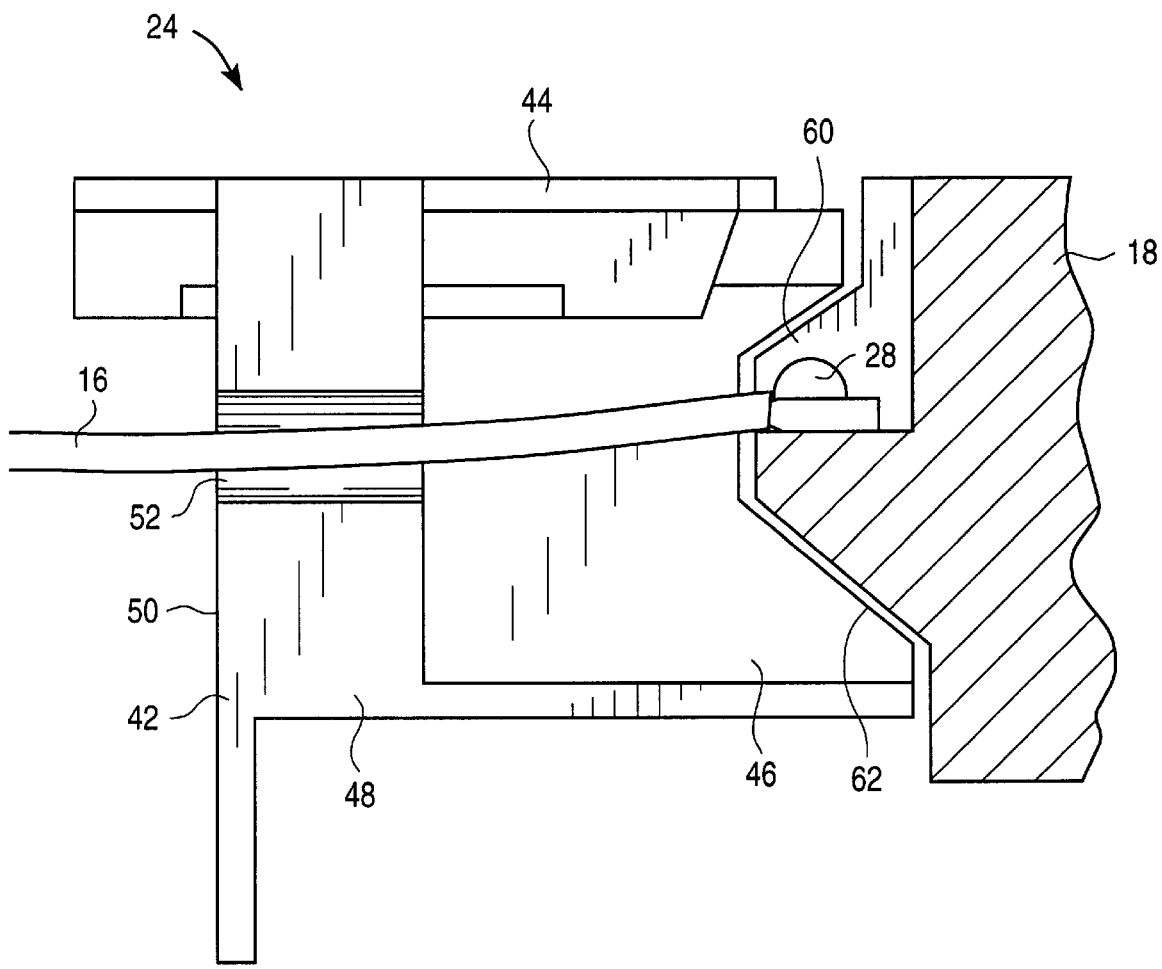
FIG. 4 is a side view illustrating the installation of the enclosure of FIG. 3A.

FIG. 4 illustrates the installation of the enclosure 24 adjacent one of the circuit breakers 18. The circuit breaker 18 has a generally convex shape 60 and the first wall 46 has a substantially concave shape 62 complementary to the convex shape 60.

FIG. 4 shows one of the electrical load conductors 16 connected to a first terminal 28 of the circuit breaker 18. The open side of the body 42 of the enclosure 24 is moved over the electrical load conductors 16. Since the aperture 52 is channel shaped, the electrical load conductors 16 extends through the aperture 52 in a direction of the first terminal 28 once the body 42 is positioned over the electrical load conductor 16. The enclosure 24 can so be installed adjacent the circuit breaker 18 with the electrical load conductor 16 extending through the aperture 52 without the need for the electrical load conductor 16 first being disconnected from the first exposed terminal 28.

When the cover 44 is located in the first position, as illustrated in FIG. 3B, the terminal 28 is exposed. Movement of the cover into the second position, as illustrated in FIG. 3C, results in the first and second side walls 46 and 48, respectively, the end wall 50, the cover 44 and the circuit breaker 18 jointly defining an enclosure for the first terminal 28. A similar enclosure may then be installed adjacent the enclosure 24 so that a first wall of the other enclosure covers the open side of the second side wall 48. By so installing the enclosure, the first terminal 28 is enclosed from all sides. A first of the enclosures 24 is located adjacent the second insulative block 41 so that the open side of the first enclosure 24 is closed off by means of the second insulative block 41. Although only a few enclosures 24 are shown, it should be understood that an enclosure 24 is installed adjacent each circuit breaker 18 in both rows 32 and 34.

Referring again to FIG. 2, an enclosure 24 would be installed over each of the first terminals 28. The cover 44 of each enclosure 24 is moved into the second position so as to enclose all of the first terminals 28. It can be seen that the transparent shield 20, the longitudinal shield 22 and the enclosures 24 now cover and enclose the metal main terminal lugs 38 and the first and second terminals 28 and 30, respectively. A dead front (not shown) would then be installed over the panel 12. The dead front would have openings through which the switches 26 can be accessed.

Should it be necessary to make or break a connection to one of the first terminals 28, the switch 26 of the circuit breaker 18 would be switched off. The dead front is then removed. Once the dead front is removed, no electrical contacts will be exposed since the transparent shield 20, the longitudinal shield 22 and the covers 44 of the enclosures 24 would be in place. The cover 44 of the circuit breaker 18 which has been switched off is then moved into the first position to expose the first terminal 28 of the relevant circuit breaker 18. Electrical connection or disconnection can then be made to the first terminal 28 of the relevant circuit breaker 18.

Once work is finalized on the relevant first terminal 28, the cover 44 of the relevant enclosure 24 is moved back into the second position, thereby enclosing the first terminal 28. The switch 26 of the relevant circuit breaker 18 would then be switched on. It can therefore be seen that electrical connection or disconnection can be made to the relevant circuit breaker 18 without exposing a live electrical contact and without switching off the entire electrical switchboard 10.

The transparent shield 20 has a hole per each metal main terminal lug 38. A plug (not shown) may be inserted into each hole and be removed for purposes of testing the temperature of the main terminal lug 38 by means of an infrared detector. The longitudinal shield 22 may be made of nontransparent material and be removed for testing the temperature of one or more of the second terminals 30. In order to measure the temperature of one of the first terminals 28, the cover 44 over the relevant first terminal 28 may be slid into the first position so as to expose the relevant first terminal 28. The relevant first terminal would then be exposed to allow for temperature testing utilizing an infrared temperature detector.

Should the enclosures 24 fit with gaps between them then objects such as gaskets may be inserted between the enclosures 24 so as to close the gaps and provide for a more rigid construction.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed:

1. An electrical panelboard which includes:
   a panel;
   two or more circuit breakers mounted to the panel, each of the circuit breakers having at least a first respective exposed terminal and a respective switch; and
   two or more covers, each cover being mounted to the panel for movement between
   a first position wherein the respective first terminal of a respective circuit breaker is exposed, and
   a second position wherein the respective first terminal of the respective circuit breaker is covered.

2. The electrical panelboard of claim 1 which includes a body secured to the panel, wherein the cover is movably mounted to the body and wherein the body and the cover jointly define at least a partial enclosure for the terminal when the cover is in the second position.

3. The electrical panelboard of claim 2 wherein the enclosure is partially defined by the circuit breaker.

4. The electrical panelboard of claim 2 wherein the cover is mounted for sliding movement to the body.

5. The electrical panelboard of claim 1 wherein the circuit breaker has at least a second external terminal, the electrical panelboard further including a closure located over the second terminal.

6. An enclosure for an external terminal of a circuit breaker on an electrical panelboard, including:
- a body defining an aperture for inserting an electrical load conductor, the body being securable to a panel of the panelboard in a position adjacent the circuit breaker; and
- a cover which is mounted to the body for movement substantially in a direction in which the electrical load conductor extends through the aperture between
  - a first position wherein the terminal is exposed, and
  - a second position wherein the body, the circuit breaker and the cover jointly enclose the terminal.

7. The enclosure of claim 6 wherein an electrical load conductor, when inserted through the aperture, extends in a direction from the aperture towards the terminal.

8. An enclosure for an external terminal of a circuit breaker which is mounted to a panel of an electrical panelboard, including:
- a body defining an aperture and formed to be positionable over an electrical load conductor when the electrical load conductor is connected to the terminal so that the electrical load conductor then extends through the aperture, the body then being securable to a panel of the panelboard and in a position adjacent the circuit breaker and being shaped so that the electrical load conductor is covered when viewed from a first side of the body and exposed when viewed from a second side of the body opposing the first side;
- a cover which is mounted to the body for movement between
  - a first position wherein the terminal is exposed; and
  - a second position wherein the body, the circuit breaker and the cover jointly enclose the terminal and the cover extends between the first and second sides.

9. The enclosure of claim 8 wherein the cover opposes a side of the body on which the body is mounted to the panel.

10. An enclosure for an external terminal of a circuit breaker mounted to a panel of an electrical circuit board, including:
- a body defining
  - a first side wall;
  - a second side wall, opposing the first side wall, the second side wall being open to allow positioning of the body over an electrical load conductor when connected to the terminal;
  - an end wall between the first and second side walls, the end wall defining an aperture which extends into the open side of the second side wall so that the electrical load conductor extends through the aperture; and
- a cover which is mounted to the body for movement between
  - a first position wherein the terminal is exposed, and
  - a second position wherein the first and second side walls, the end wall and the cover jointly define an enclosure for the terminal.

* * * * *